US008197621B2

(12) United States Patent
Jung

(10) Patent No.: US 8,197,621 B2
(45) Date of Patent: Jun. 12, 2012

(54) METHOD FOR MANUFACTURING PLANAR HEATING ELEMENT USING CARBON MICRO-FIBERS

(75) Inventor: In Jung, Yongin (KR)

(73) Assignee: Naos Co. Ltd., Yeongtong-Dong Yeongtong-Gu, Suwon-Si, Gyeonggi-Do (KR)

( * ) Notice: Subject to any disclaimer, the term of this patent is extended or adjusted under 35 U.S.C. 154(b) by 689 days.

(21) Appl. No.: 12/308,883

(22) PCT Filed: Jun. 27, 2007

(86) PCT No.: PCT/KR2007/003116
§ 371 (c)(1),
(2), (4) Date: Dec. 29, 2008

(87) PCT Pub. No.: WO2008/002071
PCT Pub. Date: Jan. 3, 2008

(65) Prior Publication Data
US 2009/0324811 A1 Dec. 31, 2009

(30) Foreign Application Priority Data
Jun. 27, 2006 (CN) .......................... 2006 1 0086658
Jun. 27, 2006 (CN) .......................... 2006 1 0086660

(51) Int. Cl.
*B29C 65/48* (2006.01)
*H05B 3/34* (2006.01)

(52) U.S. Cl. ........ 156/62.2; 156/300; 219/529; 219/549

(58) Field of Classification Search .................... 156/47, 156/62.2, 244.11, 244.27, 278, 300, 301; 219/529, 549, 553
See application file for complete search history.

(56) References Cited

U.S. PATENT DOCUMENTS 4,158,078 A * 6/1979 Egger et al. .................. 428/103
4,429,216 A * 1/1984 Brigham ...................... 219/528
4,534,886 A * 8/1985 Kraus et al. .................. 252/502
4,697,000 A * 9/1987 Witucki et al. ............... 528/423
5,023,433 A * 6/1991 Gordon ........................ 219/548
5,925,275 A * 7/1999 Lawson et al. ............... 219/543
6,057,530 A * 5/2000 Gurevich ...................... 219/529
6,172,344 B1 * 1/2001 Gordon et al. ............... 219/529
6,483,087 B2 * 11/2002 Gardner et al. .............. 219/545

* cited by examiner

*Primary Examiner* — Michael Tolin
(74) *Attorney, Agent, or Firm* — GWiPS

(57) ABSTRACT

A planar heating element using for carbon micro-fibers and its manufacturing method have developed. The high-resistant carbon micro-fibers and carbon powder are efficiently coated to completely replace a conventional heating element using resistance heat of a nichrome wire. A single heating element is possibly formed to have a large width and an ultra thin heating element without temperature restriction by overcoming drawbacks of a carbon powder printed heating element serving as an initial module of the planar heating element. Thus, it is possible to produce the various convenient heating elements or heating modules using DC and AC electricity without restriction by solving problems in installation and use, for example, space restriction, thereby various convenient heating elements.

19 Claims, 7 Drawing Sheets

【Figure 1】
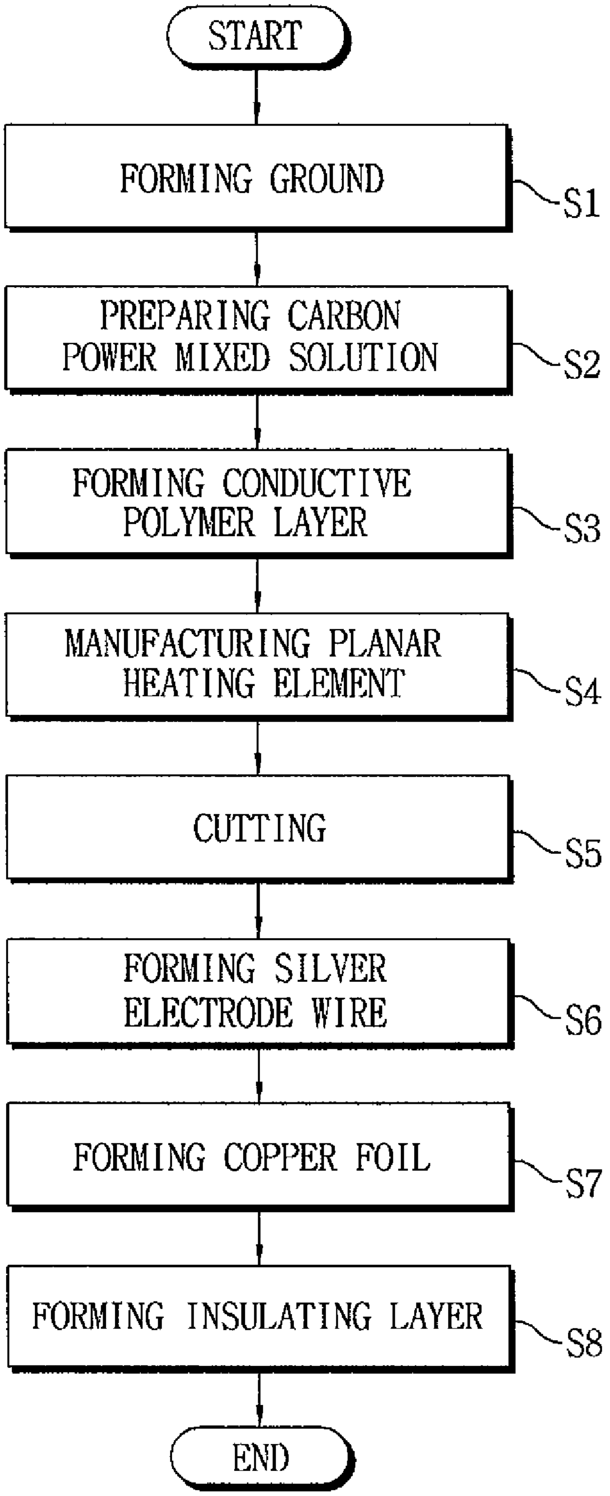

【Figure 2】
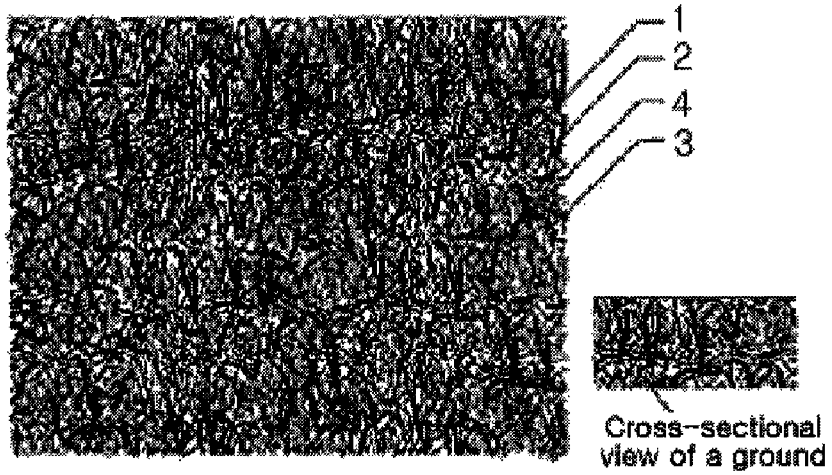
【Figure 3】
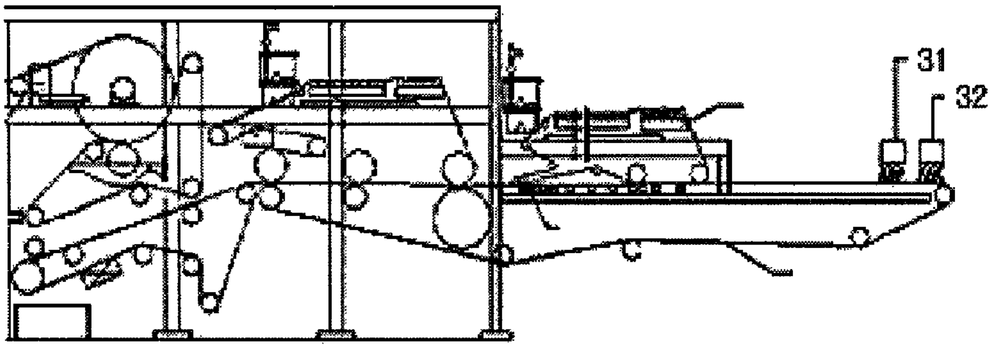
【Figure 4】
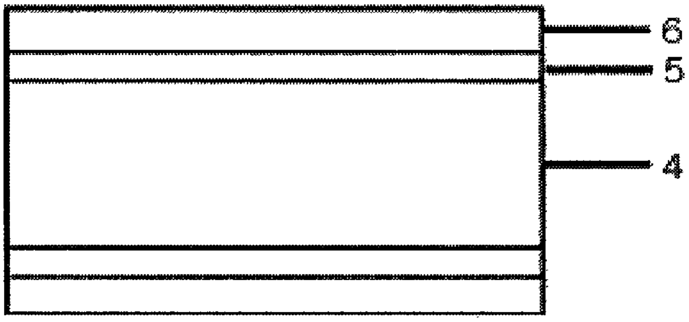

【Figure 5】
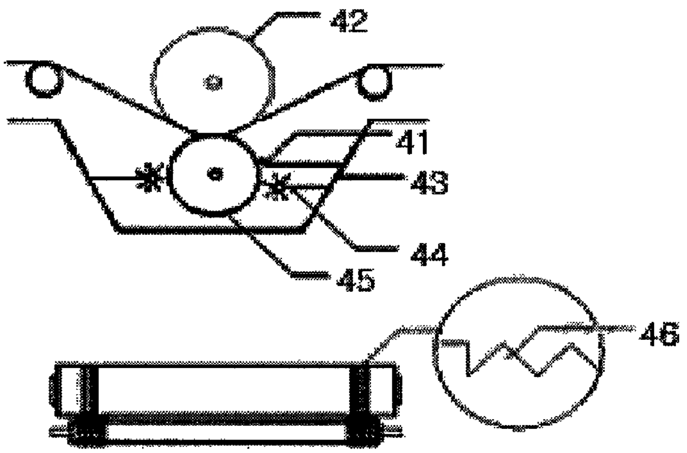
【Figure 6】
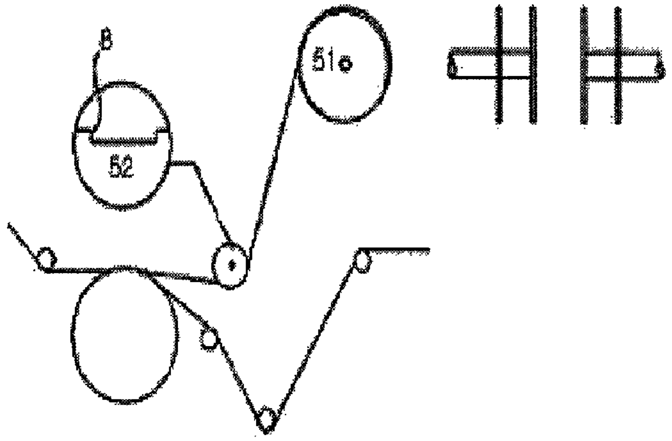
【Figure 7】
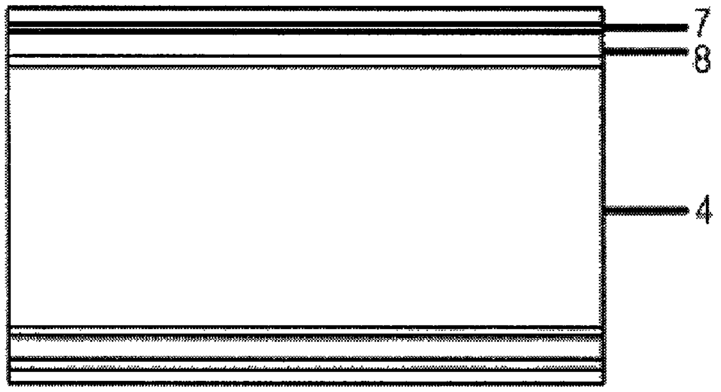

【Figure 8】
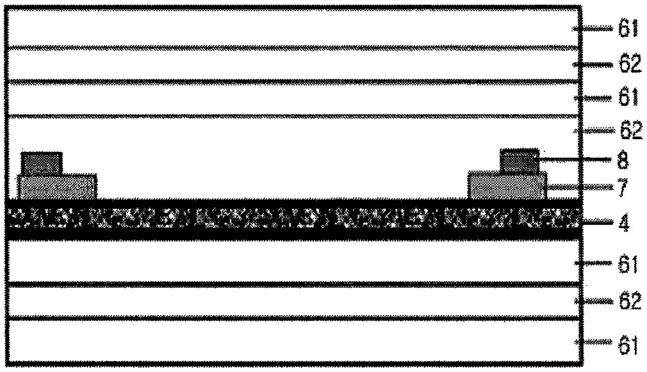
【Figure 9】
【Figure 10】
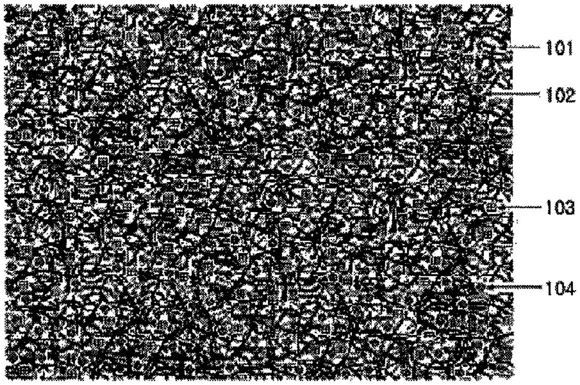

【Figure 11】
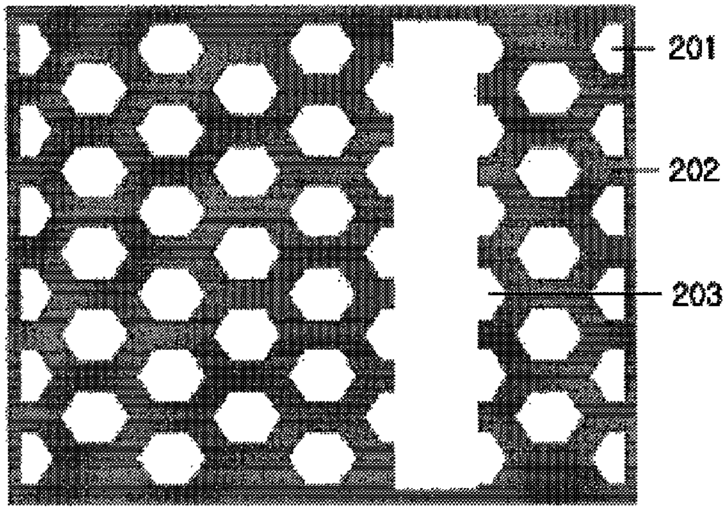
【Figure 12】
【Figure 13】
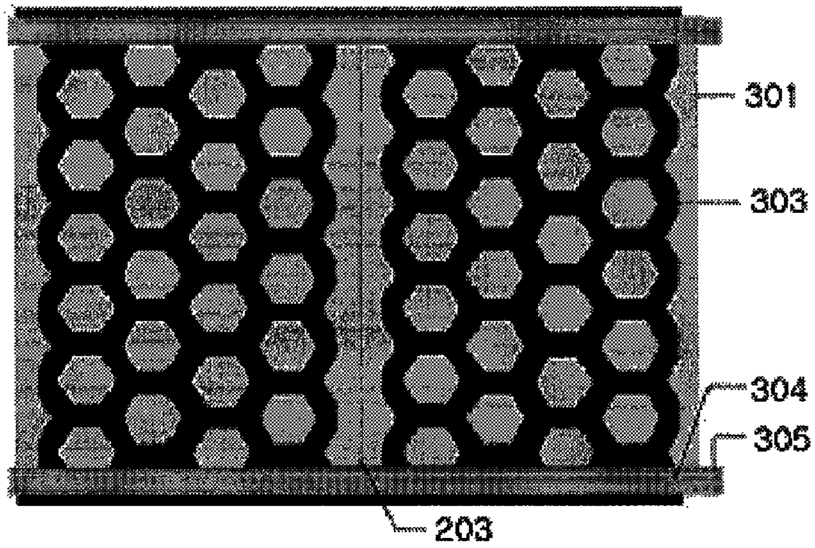

【Figure 14】
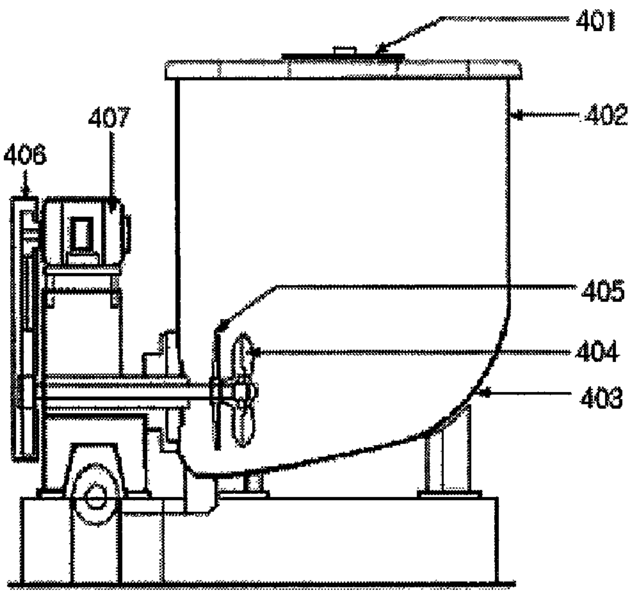
【Figure 15】
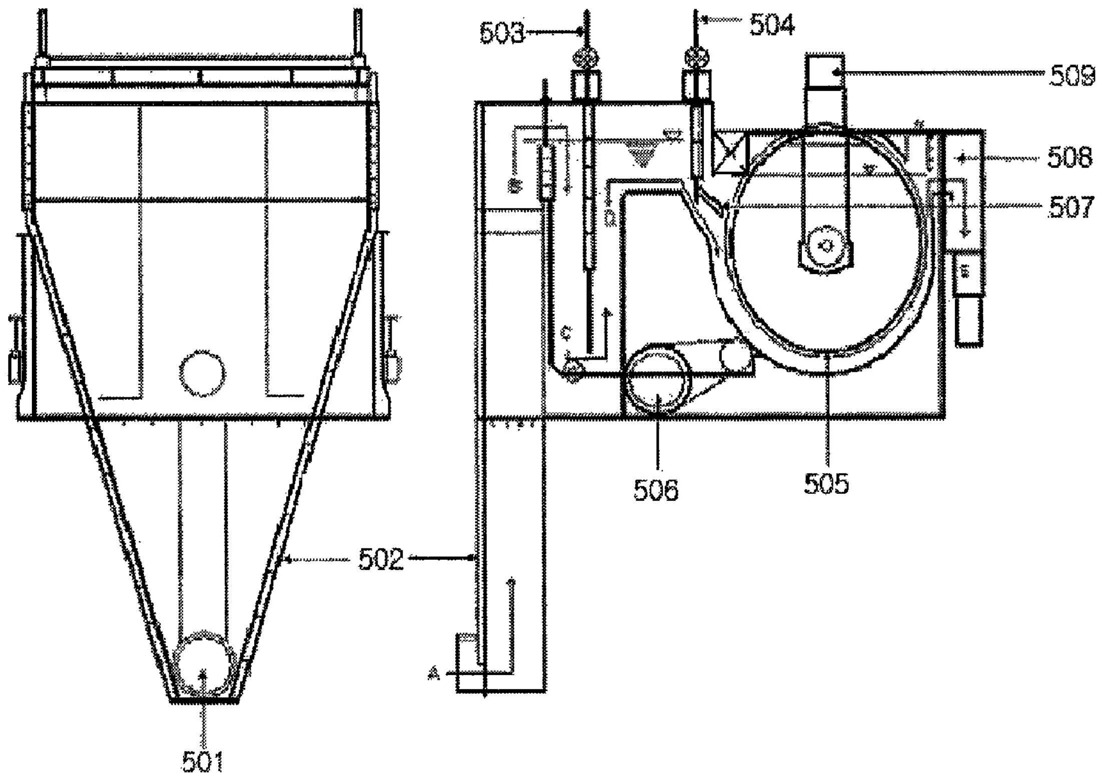

【Figure 16】
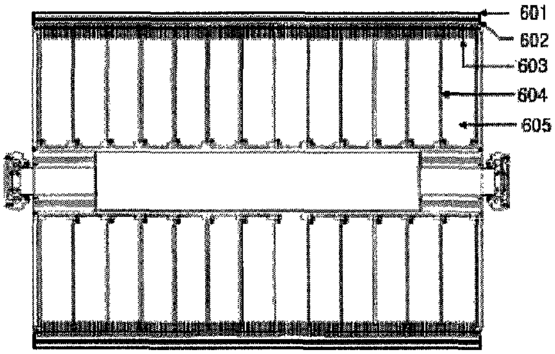
【Figure 17】
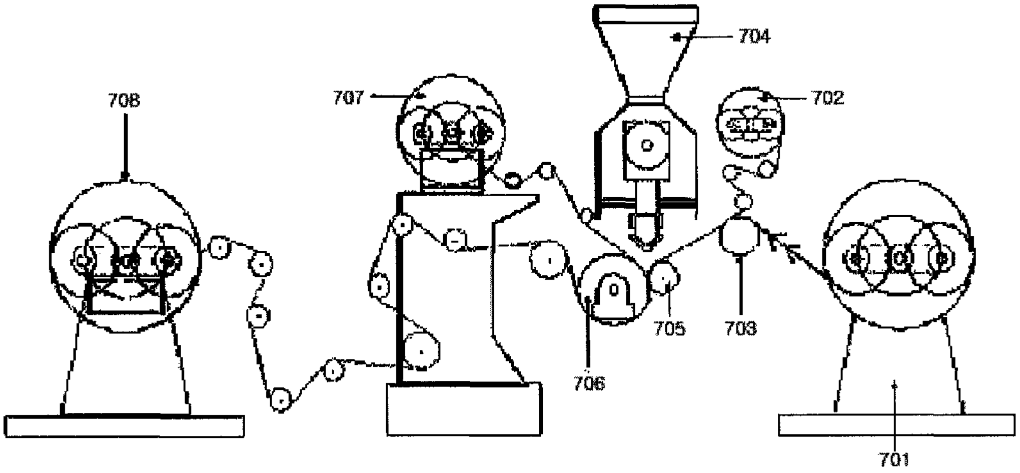

METHOD FOR MANUFACTURING PLANAR HEATING ELEMENT USING CARBON MICRO-FIBERS

BACKGROUND OF THE INVENTION

1. Field of the Invention

The present invention relates to a planar heating element using carbon micro-fibers and a method for manufacturing the same, and more particularly to a planar heating element using carbon micro-fibers and a method for manufacturing the same capable of realizing uniform temperature distribution of the entire heating element, preventing an increase in the temperature due to reduction of local resistance, prolonging a life of the heating element, and maintaining performance even when a local external load is exerted by forming a ground of the planar heating element using mixed carbon micro-fibers, pulp and synthetic fibers, and then coating carbon powder mixed with a conductive polymer on both surfaces of the ground.

2. Description of the Related Prior Art

Generally, a planar heating element made of carbon is used as a residential heating material since it is safe, makes no noises and eliminates the danger of an electromagnetic wave at the maximum.

Further, it may be used as a heating material in a commercial site such as an office or a business section. It may be used in industrial heating of a car, a warehouse, various tents and the like as various industrial heating devices. It may be used in plastic tents and the agricultural equipment such as agricultural product drying equipment. It may be used for removing snow and ice in the road, station, runway, and bridge. It may be used in portable warm-keeping equipage for relaxation and cold protection and health products, electric home appliances and livestock heating apparatuses.

In a conventional planar heating element, after carbon powder is mixed with a binder, the mixed carbon powder and binder are printed in a specified shape on a polyester (PET) film. Then, the carbon powder and binder are insulatingly adhered to the planar heating element using the polyester (PET) film and ethylene vinyl acetate (EVA) serving as a thermal adhesive.

However, the conventional planar heating element has a limited heating temperature. Theoretically, when a distance between both electrodes is 300~500 mm, a heating temperature is about 83° C. Actually, the temperature and use of the conventional planar heating element are restricted and a material of an insulating film is limited. In the heating elements of a specified temperature (about 65° C.) or more, EVA of the insulating film swells, thereby causing defects on the appearance and performance of the planar heating element. Since a common temperature is equal to or smaller than 60° C. when a distance between both electrodes is 300~500 mm, the conventional planar heating element is manufactured only as a limited planar heating element.

Further, the conventional planar heating element is sensitive to folding. That is, when the film is folded, a non-conducting state and fire may occur by an electricity concentration phenomenon along a folded interface.

Further, the conventional planar heating element employs only PET to form a regularly arranged pattern. An electric shock and defects may occur due to wrinkling in use. Various experiments have been conducted to prevent wrinkling. However, it is difficult to find an adhesive insulating material and a manufacturing method while maintaining a regularly arranged pattern.

Therefore, the present invention has been made in view of the above problems, and it is an object of the present invention to provide a planar heating element using carbon micro-fibers and a method for manufacturing the same capable of allowing the heating element to be used at a high temperature and applied to various uses by using a carbon heating element having a complex structure to highly improve a temperature application range.

Further, it is another object of the present invention to provide a planar heating element using carbon micro-fibers and a method for manufacturing the same capable of manufacturing heating elements of various temperatures by selectively using an insulating finishing material according to the heating temperature to form an insulating layer.

Further, it is yet another object of the present invention to provide a planar heating element using carbon micro-fibers and a method for manufacturing the same capable of relatively prolonging a life of the heating element by preventing the carbon micro-fibers from being in contact with air, wherein an insulating layer is formed by using a T-die ejecting molding method instead of a conventional heating element or heat roller pressing laminating method or by heat-pressing molding, and particles of the carbon micro-fibers are mixed with an organic binder.

Further, it is yet another object of the present invention to provide a planar heating element using carbon micro-fibers and a method for manufacturing the same capable of maximizing energy efficiency by punching the planar heating element using a flat plate press or a roll press for regular arrangement, and capable of increasing economical efficiency and safety by providing an insulating function and an waterproof function to a portion formed by cutting the planar heating element in its longitudinal direction.

Further, it is yet another object of the present invention to provide a planar heating element using carbon micro-fibers and a method for manufacturing the same capable of forming heating elements having various functions for various uses by selecting an insulating material from a group consisting of PE, LDPE, LLDPE, PVC, tarpaulin, TPU, PU (polyurethane) and the like, which have ductility even in folding, and resin films such as epoxy impregnated fiberglass cloth (prepreg) and phenolic impregnated fiberglass cloth, which have high hardness to provide a mechanical strength to the insulating material.

Further, it is yet another object of the present invention to provide a planar heating element using carbon micro-fibers and a method for manufacturing the same capable of manufacturing the planar heating element having multi-functions by allowing the heating element to have various widths (when a distance between both electrodes is 2400 mm, a heating temperature is about 35~150° C.), a maximum heating temperature of 380° C. and various surface materials for an insulating layer, and capable of highly reducing unnecessary electricity consumption and achieving maximum power reduction by forming a heating portion in a specified pattern.

Further, it is yet another object of the present invention to provide a planar heating element using carbon micro-fibers and a method for manufacturing the same capable of allowing the heating element to continuously perform normal functions even in folding or under partial damage by manufacturing the planar heating element having a complex multi-layer structure, capable of preventing a short circuit to maintain a heating function by reducing power when the unit load is concentrated at one spot to generate the same electricity for the concentrated unit load, capable of preventing a crack in a heating portion and solving environmental problems by using 100% water-soluble adhesive, a diluting agent and water, and capable of prolonging a life of the heating element and improving long-term heat resistance by appropriately maintaining a volatile remaining amount.

SUMMARY OF THE INVENTION

In accordance with an aspect of the present invention, the above and other objects can be accomplished by the provision of a method of manufacturing a planar heating element comprising forming a ground using a carbon micro-fiber mixed solution formed by mixing carbon micro-fibers having a length of 5~25 mm and a thickness of 20~100 μm with paper pulp, a water-soluble binder and water; preparing a carbon powder mixed solution by mixing 3~50% carbon powder with respect to the weight of the ground, 2~30% conductive polymer with respect to the weight of the ground, 1~5% water-soluble binder with respect to the weight of the ground and water; forming a conductive polymer layer by coating a conductive polymer on the ground including the carbon micro-fibers; manufacturing a planar heating element by impregnating and coating the carbon powder mixed solution on one surface or both surfaces of the ground including the conductive polymer layer and drying to form a carbon powder mixed layer; cutting the planar heating element including the carbon powder mixed layer to have a specified width and length; forming a silver electrode wire by coating a silver powder mixed solution prepared by mixing silver powder with the water-soluble binder and a diluting agent on an upper surface of the cut planar heating element to have a width of 10~25 mm from both ends of the planar heating element and drying; forming a copper foil electrode wire by pressing and forming the copper foil electrode wire having a thickness of 35~50 μm, a width of 10~25 mm and a length equal to the silver electrode wire, wherein a bottom surface of the copper foil electrode wire is coated with a conductive cohesive or adhesive mainly containing a conductive polymer, on the silver electrode wire; and forming an insulating layer by coating a melted insulating material on the planar heating element including the silver electrode wire and the copper foil electrode wire and drying.

In the step of forming a ground, the carbon micro-fiber mixed solution may be sprayed on a blanket for forming the ground in a culture tank which is maintained at a heating temperature of 60~150° C.

The carbon micro-fiber mixed solution may further include polyester-based synthetic fibers.

The carbon micro-fiber mixed solution may further include a functional inorganic material containing at least one of tourmaline and holrait stone at 1~5% with respect to the weight of the ground.

The carbon powder mixed solution may further include a functional inorganic material containing at least one of tourmaline and holrait stone at 1~5% with respect to the weight of the ground.

The carbon micro-fiber mixed solution may be formed of 8~30% carbon micro-fibers with respect to the weight of the ground, 2~30% polyester synthetic fibers with respect to the weight of the ground, and 40~90% pulp with respect to the weight of the ground.

The conductive polymer may contain at least one of polyaniline, polypyrrole and polythiophene.

The water-soluble binder may contain at least one of water-soluble epoxy resin, water-soluble acrylic resin and water-soluble urethane resin.

In the step of forming an insulating layer, an insulating solution formed by melting an insulating material at a high temperature may be coated on both surfaces of the planar heating element including the silver electrode wire and the copper foil electrode wire. An insulating film made of an insulating material may be adhered thereto by melting, and the insulating solution may be coated on an upper surface of the insulating film to form the insulating film again, such that the insulating layer has at least two layers.

The insulating material may be formed by mixing at least one selected from a group consisting of HDPE, LDPE, LLDPE, VLDPE, PP, PEN, PET, noncombustible PET, PVC, noncombustible PVC, PU, TPU, PI, silicone, and heat resistant silicone.

In accordance with another aspect of the present invention, there is provided a planar heating element manufactured by using the above-described method.

In accordance with yet another aspect of the present invention, there is provided a method of manufacturing a planar heating element comprising: forming a primary ground by mixing paper pulp, synthetic fibers such as polyester and water, wherein 40~90% paper pulp with respect to the weight of the primary ground is mixed with 5~30% polyester fibers with respect to the weight of the primary ground; forming a secondary ground by mixing paper pulp, synthetic fibers such as polyester, carbon micro-fibers and water, wherein a carbon micro-fiber mixed solution prepared by mixing 40~90% paper pulp with respect to the weight of the secondary ground, 2~30% polyester fibers with respect to the weight of the secondary ground and the carbon micro-fibers having a thickness of 15 nm~50 μm is mixed at 8~50% with respect to the weight of the secondary ground; forming a combination ground by combining the primary ground and the secondary ground; preparing a carbon powder mixed solution by mixing 3~50% carbon powder with respect to the weight of the combination ground, 2~30% conductive polymer with respect to the weight of the combination ground, 1~5% water-soluble binder with respect to the weight of the combination ground and water; manufacturing a planar heating element by impregnating and coating the carbon powder mixed solution on a secondary ground-formed surface of the combination ground and drying to form a carbon powder mixed layer; cutting the planar heating element including the carbon powder mixed layer to have a specified width and length; forming a silver electrode wire by coating a silver powder mixed solution prepared by mixing silver powder with the water-soluble binder and a diluting agent on a carbon powder mixed layer-formed surface of the cut planar heating element to have a width of 10~25 mm from both ends of the planar heating element and drying; forming a copper foil electrode wire by pressing and forming the copper foil electrode wire having a thickness of 35~50 μm, a width of 10~25 mm and a length equal to the silver electrode wire, wherein a bottom surface of the copper foil electrode wire is coated with a conductive cohesive or adhesive mainly containing a conductive polymer, on the silver electrode wire; and forming an insulating layer by coating a melted insulating material on the planar heating element including the silver electrode wire and the copper foil electrode wire and drying.

The carbon micro-fiber mixed solution may further include 0.1~40% carbon nanotubes with respect to the weight of the secondary ground.

The secondary ground may be formed in a net structure having a pattern of specified spacing and regular arrangement through a VAT wire.

The primary ground may be formed by spraying the paper pulp.

The pattern of the secondary ground may be formed in a straight-line figure such as a triangle, a diamond and a hexagon, and a cutting guide line is formed at a specified distance from the pattern.

The carbon micro-fiber mixed solution may further include a functional inorganic material containing at least one of tourmaline and holrait stone at 1~5% with respect to the weight of the secondary ground.

The carbon powder mixed solution may further include a functional inorganic material containing at least one of tourmaline and holrait stone at 1~5% with respect to the weight of the ground.

The water-soluble binder may contain at least one of water-soluble epoxy resin, water-soluble acrylic resin and water-soluble urethane resin.

The conductive polymer may contain at least one of polyaniline, polypyrrole and polythiophene.

In the step of forming an insulating layer, an insulating solution formed by melting an insulating material at a high temperature may be coated on both surfaces of the planar heating element including the silver electrode wire and the copper foil electrode wire. An insulating film made of an insulating material may be adhered thereto by melting, and the insulating solution may be coated on an upper surface of the insulating film to form the insulating film again, such that the insulating layer has at least two layers.

The insulating material may be formed by mixing at least one selected from a group consisting of HDPE, LDPE, LLDPE, VLDPE, PP, PEN, PET, noncombustible PET, PVC, noncombustible PVC, PU, TPU, PI, silicone, and heat resistant silicone.

In accordance with yet another aspect of the present invention, there is provided a planar heating element manufactured by using the above-described method.

According to a method for manufacturing a planar heating element using carbon micro-fibers of the present invention, a carbon heating element having a complex structure is used to highly improve a temperature application range, thereby allowing the heating element to be used at a high temperature and applied to various uses. Further, an insulating finishing material is selectively used according to the heating temperature to form an insulating layer, thereby manufacturing heating elements of various temperatures.

Further, according to a method for manufacturing a planar heating element using carbon micro-fibers of the present invention, compared to a conventional planar heating element, it is possible to reduce energy consumption up to a maximum of 75% by configuring and designing the heating element capable of efficiently reducing an energy consumption amount by removing an unnecessary space from the planar heating element. Further, it is possible to form the planar heating element capable of providing health promotion by using environment-friendly materials such as carbon, which emit a large amount of far infrared rays.

Further, according to a method for manufacturing a planar heating element using carbon micro-fibers of the present invention, an insulating layer is formed by using a T-die ejecting molding method instead of a conventional heating element or heat roller pressing laminating method or by heat-pressing molding, and particles of the carbon micro-fibers are mixed with an organic binder. Accordingly, it is possible to relatively prolong a life of the heating element by preventing the carbon micro-fibers from being in contact with air. Further, an insulating material is selected from a group consisting of PE, LDPE, LLDPE, PVC, tarpaulin, TPU, PU (polyurethane) and the like, which have ductility even in folding, and resin films such as epoxy impregnated fiberglass cloth (prepreg) and phenolic impregnated fiberglass cloth, which have high hardness to provide a mechanical strength to the insulating material. Accordingly, it is possible to form heating elements having various functions for various uses.

Further, according to a method for manufacturing a planar heating element using carbon micro-fibers of the present invention, it is possible to completely replace a conventional heating element using resistance heat of a nichrome wire by efficiently coating carbon micro-fibers, carbon nanotubes and carbon powder. Further, it is possible to form a single heating element having a large width and an ultra thin heating element without temperature restriction by overcoming drawbacks of a carbon powder printed heating element serving as an initial module of the planar heating element. Thus, it is possible to form various convenient heating elements or heating modules using DC and AC electricity without restriction by solving problems in installation and use, for example, space restriction, thereby various convenient heating elements.

Further, according to a method for manufacturing a planar heating element using carbon micro-fibers of the present invention, the planar heating element has a structure without the bad effect of an electromagnetic wave generated in a conventional planar heating element, thereby having advantages in health. Further, it is possible to highly reduce an electricity consumption amount compared to other planar heating elements, thereby increasing economical efficiency and minimizing environmental pollution.

BRIEF DESCRIPTION OF THE DRAWINGS

The above and other objects, features and other advantages of the present invention will be more clearly understood from the following detailed description taken in conjunction with the accompanying drawings, in which:

FIG. 1 shows a flowchart for explaining a method for manufacturing a planar heating element using carbon micro-fibers according to the first embodiment of the present invention;

FIG. 2 shows a plan view and a cross-sectional view of a ground with prepared and cultured carbon micro-fibers according to the method for manufacturing a planar heating element using carbon micro-fibers according to the first embodiment of the present invention;

FIG. 3 shows a side view of the equipment for manufacturing the ground according to the method for manufacturing a planar heating element using carbon micro-fibers according to the first embodiment of the present invention;

FIG. 4 shows a state in which a carbon powder mixed solution is coated on the prepared and cultured ground according to the method for manufacturing a planar heating element using carbon micro-fibers according to the first embodiment of the present invention;

FIG. 5 shows a side view of a silver powder coating apparatus according to the method for manufacturing a planar heating element using carbon micro-fibers according to the first embodiment of the present invention;

FIG. 6 shows a side view of a copper foil installing apparatus according to the method for manufacturing a planar heating element using carbon micro-fibers according to the first embodiment of the present invention;

FIG. 7 shows a cross-sectional view of the planar heating element manufactured according to the method for manufacturing a planar heating element using carbon micro-fibers according to the first embodiment of the present invention;

FIG. 8 shows a cross-sectional view of the planar heating element manufactured according to the method for manufacturing a planar heating element using carbon micro-fibers according to the first embodiment of the present invention;

FIG. 9 shows a diagram showing a planar heating element manufacturing apparatus using carbon micro-fibers according to the second embodiment of the present invention;

FIG. 10 shows a primary ground in the method for manufacturing a planar heating element using carbon micro-fibers according to the second embodiment of the present invention;

FIG. 11 shows a secondary ground in the method for manufacturing a planar heating element using carbon micro-fibers according to the second embodiment of the present invention;

FIG. 12 shows a ground in the method for manufacturing a planar heating element using carbon micro-fibers according to the second embodiment of the present invention;

FIG. 13 shows a structure of a planar heating element manufactured by the method for manufacturing a planar heating element using carbon micro-fibers according to the second embodiment of the present invention;

FIG. 14 shows a configuration of a long fiber dissociation apparatus used in the method for manufacturing a planar heating element using carbon micro-fibers according to the second embodiment of the present invention;

FIG. 15 shows a VAT apparatus used in the method for manufacturing a planar heating element using carbon micro-fibers according to the second embodiment of the present invention;

FIG. 16 shows a configuration of wires of the VAT apparatus used in the method for manufacturing a planar heating element using carbon micro-fibers according to the second embodiment of the present invention; and FIG. 17 shows a configuration of an insulating film coating apparatus used in the method for manufacturing a planar heating element using carbon micro-fibers according to the second embodiment of the present invention.

DETAILED DESCRIPTION OF THE PREFERRED EMBODIMENTS

<<First Embodiment >>

Hereinafter, a method for manufacturing a planar heating element using carbon micro-fibers according to a first embodiment of the present invention will be described in detail with reference to the accompanying drawings.

In the following description of the present invention, detailed description of related function and configuration is omitted when it can make main points of the present invention vague. The following terms are defined by considering the function of the present invention and they can be changed according to intention of a user or custom. Thus, definition of terms should be made based on the content of the whole specification.

FIG. 1 shows a flowchart for explaining a method for manufacturing a planar heating element using carbon micro-fibers according to the first embodiment of the present invention. FIG. 2 shows a plan view and a cross-sectional view of a ground with prepared and cultured carbon micro-fibers according to the method for manufacturing a planar heating element using carbon micro-fibers according to the first embodiment of the present invention. FIG. 3 shows a side view of the equipment for manufacturing the ground according to the method for manufacturing a planar heating element using carbon micro-fibers according to the first embodiment of the present invention. FIG. 4 shows a state in which a carbon powder mixed solution is coated on the prepared and cultured ground according to the method for manufacturing a planar heating element using carbon micro-fibers according to the first embodiment of the present invention. FIG. 5 shows a side view of a silver powder coating apparatus according to the method for manufacturing a planar heating element using carbon micro-fibers according to the first embodiment of the present invention. FIG. 6 shows a side view of a copper foil installing apparatus according to the method for manufacturing a planar heating element using carbon micro-fibers according to the first embodiment of the present invention. FIG. 7 shows a cross-sectional view of the planar heating element manufactured according to the method for manufacturing a planar heating element using carbon micro-fibers according to the first embodiment of the present invention. FIG. 8 shows a cross-sectional view of the planar heating element manufactured according to the method for manufacturing a planar heating element using carbon micro-fibers according to the first embodiment of the present invention.

<Process for Forming a Ground>

First, in a process for forming a ground in the present invention, carbon micro-fibers 1 having a length of 5~25 mm and a thickness of 20~100 μm may be mixed with paper pulp 3, a water-soluble binder and water. Further, the carbon micro-fibers 1 may be mixed with polyester-based synthetic fibers 2, the paper pulp 3, the water-soluble binder and water. The carbon micro-fibers 1 (8~30%), polyester-based synthetic fibers 2 (2~30%), the paper pulp 3 (40~90%), the water-soluble binder and water are mixed to prepare a carbon micro-fiber mixed solution (S1).

In this case, a water content is properly determined to dilute the mixed solution. A functional inorganic material 4 having at least one of powdered tourmaline and holrait stone may be further mixed with the carbon micro-fiber mixed solution at a specified ratio.

Then, a culture tank in the equipment shown in FIG. 3 is maintained at a heating temperature of 60~150° C. A first spraying process is performed on a blanket for forming a ground through a head box 31. A second spraying process is performed to form a ground through an open head box 32 to prevent the carbon micro-fibers having a long length from being trapped or massed while the carbon micro-fibers are sprayed through the head box 31. Through those processes, it is possible to overcome a problem such that a heating element cannot be formed to have a width greater than a range of 30~100 cm. Thus, it is possible to form a heating element having carbon micro-fibers to have a width greater than a range of 30~240 cm.

Referring to FIGS. 2 and 3, those processes are described in detail. The carbon micro-fiber mixed solution obtained by mixing the carbon micro-fibers 1, the polyester-based synthetic fibers 2, the paper pulp 3 and the water-soluble binder (polyacrylonitrile, epoxy resin or polyurethane resin) with water is put in a heated culture tank. Then, the carbon micro-fiber mixed solution is stirred with rotation wings which are disposed in the culture tank to rotate forward and backward.

Further, the carbon micro-fiber mixed solution is sprayed on the blanket at a specified spraying rate through the head box 31 and the open head box 32 serving as a spraying device. The ground of carbon micro-fibers is formed of a conductive material having a basic resistance as a planar heating element using a combi, gravure, or strip-bar method for directionality and culture of the carbon micro-fibers.

Then, moisture is removed from the ground using depressurized air through a decompressor. The ground is dried by a heat dryer and rolled by a specified length. A cutting process is performed to remove foreign substances from both surfaces of the ground, thereby completing the ground with carbon micro-fibers according to the present invention.

<Process for Preparing a Carbon Powder Mixed Solution>

In a process for preparing a carbon powder mixed solution in the present invention, at least one of acetylene-based, pitch-based, pene-based, and coconut-based carbon powder is selected and mixed at a proper ratio. A carbon powder mixed solution is prepared by mixing 0.1~50% carbon powder with respect to the weight of the ground, 0.2~30% conductive polymer with respect to the weight of the ground, 0.1~40% water-soluble binder with respect to the weight of the ground and water (S2).

The carbon powder mixed solution further contains a functional inorganic material having at least one of tourmaline and holrait stone at 0.1~45% with respect to the weight of the ground.

Meanwhile, in the conventional planar heating element, since a poisonous volatile material (e.g., MEK) is used when carbon powder is adhered using an organic binder, it has a great influence on the air pollution and the operation environment. The volatile remaining amount of the binder and a diluting agent should be maintained at 5% or less in order to prevent expansion of the heating element due to an increase in temperature or crack of a carbon powder mixed layer 6. However, since it is difficult to quickly dry the carbon powder mixed layer, it is difficult to maintain the volatile remaining amount.

Thus, in the present invention, 100% water-soluble binder and water are used to solve the environmental problem and measurably simplify a process of maintaining the volatile remaining amount. Although the carbon powder mixed solution having a resistance in a range of 400~600Ω has been used, the carbon powder mixed solution can have a resistance of a wide range from 30~5800Ω. Thus, various heating elements can be formed to have a width and a heating temperature in a wider range.

<Process for Forming a Conductive Polymer Layer>

In a process for forming a conductive polymer layer in the present invention, at least one of aniline-based, pyrrole-based and thiophene-based conductive polymer is selected and mixed. The conductive polymer is coated on the ground including the carbon micro-fibers to form a conductive polymer layer 5 (S3).

<Process for Manufacturing a Planar Heating Element>

In a process for coating the carbon powder mixed solution in the present invention, the carbon powder mixed solution is impregnated and coated on one surface or both surfaces of the ground including the conductive polymer layer 5 and then dried to form the carbon powder mixed layer 6, thereby manufacturing a planar heating element (S4).

FIG. 4 shows a cross-sectional view of the ground, wherein the conductive polymer and the carbon powder mixed solution are impregnated or coated at a specified amount on one surface or both surfaces of the ground including the carbon micro-fibers 1, the polyester-based synthetic fibers 2 and the pulp 3. By such a configuration, it is possible to reduce a temperature variation of the planar heating element caused by nonuniform distribution or tangling of the carbon micro-fibers 1. It is possible to prevent a rapid partial increase in the temperature due to reduction of local resistance. It is possible to provide uniformity of the temperature by filling fine cavities of the carbon powder mixed layer 6 with the conductive polymer. It is possible to increase a bearing force against a concentrated load exerted from the outside and maximize efficiency of consumption energy per unit area, thereby forming a heating element having low consumption powder.

Further, in a conventional planar heating element, a pattern is printed on a PET film by silk screen printing. A ground having carbon filaments has been used as a heating element. However, in the present invention, as described above, the carbon powder mixed solution is coated on the ground having the carbon micro-fibers by using an impregnation method, an air spraying method or a gravure method.

In the impregnation coating method, it is possible to control a thickness of the carbon powder mixed solution and, at the same time, to coat a single surface or both surfaces of the ground having the carbon micro-fibers by controlling a resistance of the carbon powder mixed solution and a distance of a pressing roller. Accordingly, it is possible to freely vary a heating temperature and a width of the planar heating element.

Further, in the air spraying coating method, both surfaces of the ground can have different heating temperatures by varying a composition and a resistance value of the carbon powder mixed solution. At the same time, it is possible to freely vary a heating temperature and a width of the planar heating element by controlling a spraying amount.

Further, in the gravure printing coating method, viscosity and resistance of the carbon powder mixed solution are controlled, thereby realizing various colors according to chroma, enhancing beauty of the appearance, and freely varying the temperature and width of the planar heating element.

Thus, various resistance values can be realized by combining contents of the carbon micro-fibers 1 of the ground, the conductive polymer and the carbon powder mixed solution, thereby enlarging the width of the planar heating element. Further, the planar heating elements having the same width can generate heat at different temperatures. It is possible to make an excellent planar heating element having multi-functions without any problems caused by short circuit even in folding or bending by forming a multi-layer structure capable of conducting electricity.

Conventionally, when carbon powder is coated on the PET film to have a specified thickness, the carbon powder mixed with an organic diluting agent (mainly, MEK or acetone) and a binder is coated and then rapidly dried. Accordingly, a crack may be generated in a drying process. An insulating film may be peeled from the planar heating element or swelled due to insufficient drying of the diluting agent, thereby causing loss of functions. In the present invention, a water-soluble acryl-based or water-soluble epoxy-based binder is diluted using the carbon powder mixed solution and water as a solvent. Thus, it is possible to improve the operation environment and allow sufficient drying in the drying process. Moisture remaining after the drying process can be further dried by remaining heat, thereby preventing a crack or peeling from being generated due to incomplete drying.

Further, it is possible to vary the resistance within a range of 30~5800Ω by continuously supplying the carbon powder mixed solution mechanically mixed by the equipment shown in FIG. 3. Accordingly, the planar heating element having a specified width can be heated at various temperatures, and the planar heating elements having various widths can be heated at a specified temperature. Further, it is possible to configure heating elements for various DC and AC voltages.

<Cutting Process>

In a cutting process in the present invention, the planar heating element including the carbon powder mixed layer 6 is cut to have a specified width and length as required (S5).

<Process for Installing an Electrode Wire>

In a process for installing an electrode wire in the present invention, a silver powder mixed solution is prepared by mixing silver powder with a silicon, urethane or urepoxy (mixture of urethane and epoxy resin) binder and a diluting agent. Then, the planar heating element cut to have a specified width and length and the silver powder mixed solution are fed to a silver powder tank 43, i.e., a mixing tank. A pumping roller 45 with horizontal or vertical rotation wings 44 and a scratching device (doctor knife) 41 are mounted on the silver powder tank 43. A single or a plurality of electrodes 46 are engraved in a funnel shape on a rubber or stainless steel printing roller 42 to form specified electrodes having an electrode width of 1~25 mm. The silver powder mixed solution is applied to the printing roller 42. Then, the silver powder mixed solution is printed on the planar heating element by the printing roller 42 and then dried, thereby installing a silver electrode wire 7 having a width of 1~25 mm (S6).

Next, a rolled copper foil having a thickness of 35~50 μm is prepared, wherein the bottom surface of the rolled copper foil is treated with a conductive cohesive or adhesive mainly containing a conductive polymer (aniline-based, pyrrole-based or thiophene-based polymer). The rolled copper foil is cut by a laser to have a width of 10~25 mm. Then, the rolled copper foil is disposed on the silver electrode wire 7 to overlap each other or spaced at a specified distance, about 2~10 mm, from the silver electrode wire 7. The rolled copper foil is pressed and installed to form a copper foil electrode wire 8 (S7).

By installing the copper foil electrode wire 8 as described above, it is possible to prevent a conventional problem such as separation of the copper foil even in wrinkling. Further, it is possible to prevent electric vibration due to an electric discharge and an electric leakage due to moisture generated in use.

Specifically, the silver electrode wire 7 serving as a basic electrode is formed on the planar heating element wherein the carbon powder mixed solution is coated on the planar heating element and then dried while continuously stirring the silver powder mixed solution in the mixing tank. Accordingly, the planar heating element has a function of preventing arc phenomena which are generated when electricity is concentrated on a local portion of the electrode.

Further, it is possible to compensate an electricity loss and an electricity conducting rate of the copper foil electrode wire 8 by continuously stirring the silver powder mixed solution in the mixing tank. Accordingly, it is possible to minimize heat generation due to self-resistance generated in the electrode and prolong a life of the electrode. Further, since the electrode is formed by adhering the silver electrode wire 7 closely to the planar heating element, it is possible to prevent arc phenomena in the electrode wire.

In this case, it is important to form the silver electrode wire 7 to have a uniform performance. As shown in FIG. 5, the specially-developed pumping roller 45 has rubber or metal rotation wings 44 attached to a pipe made of aluminum, stainless steel or specially-coated rubber. A specified amount of silver powder is scattered and coated on the stainless steel printing roller 42 with an engraved funnel pattern by the pumping roller 45.

Further, the stainless steel printing roller with an engraved funnel pattern is rotated while the silver powder mixed solution is filled in the engraved funnel pattern. The silver powder mixed solution is scratched by the doctor knife serving as a scratching device to leave a specified amount of the silver powder mixed solution. The silver powder mixed solution is implanted in the planar heating element to print the silver electrode wire 7 on the planar heating element.

When the silver electrode wire 7 is completely dried, a conductive cohesive or adhesive mainly containing a conductive polymer (aniline-based, pyrrole-based or thiophene-based polymer) is coated on the bottom surface (surface in contact with the silver electrode wire) of the rolled copper foil at a thickness of 4~30 μm. The copper foil is rolled with temporary attachment using a release film such that the conductive cohesive or adhesive is not adhered to each other. The copper foil having a thickness of 25~50 μm is cut by a laser to have a width of 5~25 mm.

Then, the copper foil is mounted on an electrode roller 51 made of plastic or metal as shown in FIG. 6 to form the copper foil electrode wire 8 in a groove having a depth of 0.2~3 mm of an electrode guide roller 52 made of plastic or Teflon. The release film is separated and introduced into a release film suction device which performs suction with air. The copper foil electrode wire 8 treated with the conductive cohesive or adhesive is disposed on the silver electrode wire 7 to overlap each other or spaced at a specified distance, about 2~10 mm, from the silver electrode wire 7. The copper foil electrode wire 8 is pressed and installed.

As described above, by pressing the copper foil electrode wire 8 on the silver electrode wire 7, it is possible to prevent an electrode defect such as arc discharge due to an increase in an interfacial conducting resistance and concentration of electricity. The planar heating element capable of conducting electricity can be used as a single body having a length of 15~30 m without a temperature difference between temperatures of an electricity leading part and an end part. Further, it is configured to have multiple electrode wires to prevent heat generation of the electrode wires due to an overload at the electrode. Accordingly, it is possible to prevent arc phenomena due to partial damage of the electrode wires, an increase in an interfacial conducting resistance or excitation. Thus, it is possible to enhance safety of the planar heating element, minimize vibration of an electromagnetic wave and prolong a life of the planar heating element.

<Process for Insulating the Planar Heating Element>

In a process for insulating the planar heating element in the present invention, an insulating solution containing a melted insulating material is coated on the planar heating element including the copper foil electrode wire 8. The planar heating element is pressed by an insulating film or coated with the insulating solution to form an insulating layer by injection, thereby completing the planar heating element as shown in FIG. 8 (S8).

However, in the conventional planar heating element, after carbon powder is mixed with a binder, the mixed carbon powder and binder are printed in a specified shape on a polyester (PET) film. Then, the carbon powder and binder are insulatingly adhered to the planar heating element using the polyester (PET) film and ethylene vinyl acetate (EVA) serving as a thermal adhesive. The conventional planar heating element has a limit in the heating temperature (theoretical limit value of 83° C.). Accordingly, it is difficult to employ the planar heating element for various uses. Further, there is a limit in a material of the insulating film, and EVA adhered to the insulating film swells in heating at a specified temperature (about 65° C.) or more, thereby causing defects on the appearance and performance of the planar heating element. The conventional planar heating element is manufactured only as a limited planar heating element.

The method of the present invention is very different from the conventional method of manufacturing the planar heating element in a process for coating an insulating material, particularly, an adhesion method of adhering the insulating material to the planar heating element and an adhesive material.

An insulating layer and an insulating film used in the manufacture of the conventional planar heating element is a film having a specified physical property (for example, a thermal laminated insulating film with a thermal adhesive coated on a PET film) without having a multi-layer structure. A heat roller type laminating apparatus is used in order to increase a structural strength of the planar heating element and ensure a waterproof property and durability, wherein an insulating material is adhered to the planar heating element at specified temperature and pressure with an adhesive strength of a thermal adhesive by pressing the insulating material with a pressing roller after heating a heat roller.

In the conventional method, the planar heating element can be manufactured easily and conveniently with low manufacturing cost. However, when the planar heating element is heated to a specified temperature, i.e., 60~80° C. or more during the use of the planar heating element, the EVA used as a film adhesive is melted and undergoes volumetric expansion, and the insulating film of the planar heating element swells, thereby causing defects of the planar heating element.

In the method of the present invention, in order to prevent the defects and provide safe products to consumers, an insulating material is selected from raw materials (pellets) including HDPE, LDPE, LLDPE, VLDPE, PP, PEN, PET, noncombustible PET, PVC, tarpaulin, noncombustible PVC, PU, TPU, PI, epoxy impregnated fiberglass cloth (prepreg), phenolic impregnated fiberglass cloth, silicone, heat resistant silicone and the like. The insulating material is melted in an ejector in a T-die method. Then, it is ejected at a specified pressure to be coated on the planar heating element. The planar heating element passes through a barrel and an army through a screw, thereby melting and adhering an insulating film (HDPE, LDPE, LLDPE, VLDPE, PP, PEN, PET, noncombustible PET, PVC, noncombustible PVC, PU, TPU, PI, silicone, or heat resistant silicone) directly on the planar heating element in a T-die. Thus, it is possible to manufacture products having a wide temperature range compared to the conventional adhesive having a limit in the temperature. Further, it is possible to manufacture products with highly increased waterproof property and durability.

Consequently, in the method of the present invention, a carbon heating element having a complex structure is used to highly improve a temperature application range, thereby enabling the heating element having a thickness of 0.15~0.8 mm to be heated to a temperature of 380° C. Thus, it is possible to manufacture heating elements for various uses. Further, the insulating material and the insulating film are selectively used according to the heating temperature to form an insulating layer, thereby manufacturing heating elements of various temperatures.

For example, in the heating elements of a temperature equal to or smaller than 100° C., the insulating film is formed of a PET composite multi-layer film, a PVC composite multi-layer film, or a PEN composite multi-layer film. PVC, PET, PE or urethane resin is melted in the T-die to be used as an adhesive, thereby extremely controlling heat resistance and the amount of air generated when a heat-pressed film is laminated and adhered to the heating element. Accordingly, it is possible to ensure high adhesive strength and airtightness. Further, it is possible to prevent deformation such as twisting, shrinking or swelling of the planar heating element according to an increase in the temperature, loss of functions of the heating element, and arc phenomena. As a result, it is possible to manufacture products for various uses with a prolonged life.

Further, in the heating elements of a temperature equal to or smaller than 70~180° C., the insulating film is formed of a PET composite multi-layer film or prepreg (material with phenolic resin or epoxy resin impregnated into fiberglass). PVC-based resin, PE-based resin, urepoxy resin or polyurethane resin is melted in the T-die to be used as an adhesive. In the heating elements of a temperature equal to or smaller than 150~300° C., the insulating film is formed of a polyimide (PI) film and polyimide is used as an adhesive.

Further, in the heating elements of a temperature equal to or smaller than 200~400° C., the insulating film is formed of heat resistant silicone resin. The insulating film selected according to temperature is formed by using a T-die ejecting molding method instead of a conventional heating element or heat roller pressing laminating method, or by heat-pressing molding, thereby forming a carbon heating element having a complex structure. It is possible to apply an insulating coating to have a relatively uniform thickness in a width direction and increase a cooling speed of the film, thereby enabling a high-speed mass production and maintaining uniform quality of the products. Since the insulating film is formed of a heat resistant or noncombustible material, the insulating film is self-extinguished without ignition upon generation of the arc.

<<Second Embodiment >>

Hereinafter, a method for manufacturing a planar heating element using carbon micro-fibers according to a second embodiment of the present invention will be described in detail with reference to the accompanying drawings.

In the following description of the present invention, detailed description of related function and configuration is omitted when it can make main points of the present invention vague. The following terms are defined by considering the function of the present invention and they can be changed according to an intention of a user or custom. Thus, definition of terms should be made based on the content of the whole specification.

FIG. 9 shows a diagram showing a planar heating element manufacturing apparatus using carbon micro-fibers according to the second embodiment of the present invention. FIG. 10 shows a primary ground in the method for manufacturing a planar heating element using carbon micro-fibers according to the second embodiment of the present invention. FIG. 11 shows a secondary ground in the method for manufacturing a planar heating element using carbon micro-fibers according to the second embodiment of the present invention. FIG. 12 shows a ground in the method for manufacturing a planar heating element using carbon micro-fibers according to the second embodiment of the present invention. FIG. 13 shows a structure of a planar heating element manufactured by the method for manufacturing a planar heating element using carbon micro-fibers according to the second embodiment of the present invention. FIG. 14 shows a configuration of a long fiber dissociation apparatus used in the method for manufacturing a planar heating element using carbon micro-fibers according to the second embodiment of the present invention. FIG. 15 shows a VAT apparatus used in the method for manufacturing a planar heating element using carbon micro-fibers according to the second embodiment of the present invention. FIG. 16 shows a configuration of wires of the VAT apparatus used in the method for manufacturing a planar heating element using carbon micro-fibers according to the second embodiment of the present invention. FIG. 17 shows a configuration of an insulating film coating apparatus used in the method for manufacturing a planar heating element using carbon micro-fibers according to the second embodiment of the present invention.

Referring to FIG. 9, the planar heating element according to the present invention is manufactured by forming a primary ground in a wire part; forming a secondary ground in a VAT part; forming a net-shaped heating element on the secondary ground; performing a drying process in a dry part; and forming a silver electrode wire on the secondary ground in a silver electrode forming apparatus having a silver powder tank, a powder pumping roller and an electrode printing roller, adhering a copper foil on the silver electrode wire to combine each other in a copper supply apparatus, and after drying, combining melted resin and an insulating film by pressing in an insulating film supply apparatus and a T-die in a subsequent paper manufacture part.

Referring to FIG. 10, 40~90% natural pulp 101 with respect to the weight of the primary ground, 5~30% polyester synthetic fibers 102 with respect to the weight of the primary ground, a water-soluble binder (polyacrylonitrile or a chemical mixture containing water-soluble epoxy resin and PVA) 104, an inorganic material 103 such as yellow ocher, ceramic, holrait stone and tourmaline are prepared to manufacture the primary ground. The prepared materials are stirred by forward and backward rotating rotation wings having blades installed at specified spacing in a heated beating tank. The stirred materials are sprayed on a blanket at a specified spraying rate through a head box or an open head box serving as a mixed solution spraying device. The primary ground for forming carbon micro-fibers is formed using a long net, a circular net, combi, gravure, or strip-bar method for directionality and culture of the ground.

Then, 40~90% natural pulp with respect to the weight of the secondary ground, 2~30% synthetic fibers such as polyester with respect to the weight of the secondary ground, and 8~50% carbon micro-fibers with respect to the weight of the secondary ground are mixed and cultured to manufacture the secondary ground. In this case, the carbon micro-fibers have a thickness of 15 nm~50 μm. Preferably, when raw materials are fed in a solid state after heating at a specified temperature of 60~150° C., a low speed motor of 20~150 rpm is used to prevent fibers from leaning to one side or being massed and to uniformly spray the raw materials.

Referring to FIG. 14, the secondary ground is manufactured by using a screw pump of one pitch type suitable for feeding the carbon micro-fibers of long fibers at a heating temperature of 60~150° C. to maintain a culture tank in a smooth beating state, and a long fiber dissociation apparatus having a piping device to prevent fibers from leaning to one side or being massed when the raw materials are pressed and fed. The long fiber dissociation apparatus includes a low speed motor 407 of 20~150 rpm to uniformly disperse and mix the raw materials charged into a raw material loading port 401, a dissociation tank 402 with left-right, up-down inclination of R1100, an impeller 404 for rotating the fed raw materials vertically instead of horizontally, and an auxiliary impeller 405 of a long blade shape to prevent cutting of long fibers. If an inclination angle of the dissociation tank 402 is small, there is a problem that the raw materials are insufficiently mixed or tangled at the both ends of the tank containing the raw materials. Accordingly, the dissociation tank 402 is formed to have a large inclination angle to solve the problem. Thus, it is possible to form the planar heating element to have uniform resistance distribution.

Referring to FIG. 15, a cylinder VAT having an inclined tube 502 with no supply pressure of the raw materials is used in order to maintain a constant basic weight and resistance of the secondary ground. That is, the inclined tube 502 is designed to decrease a force-feed pressure of the raw materials in the tube and prevent the raw materials from being massed due to vortex motion. A mixture of the raw materials charged into the inclined tube 502 is supplied to a gate wall 503 approximately at a natural pressure. A ratio of a longitudinal tensile strength (MD) in a proceeding direction of the apparatus to a transverse tensile strength (CD) in a direction perpendicular to the proceeding direction of the apparatus in the planar heating element is determined by a rotation velocity of the cylinder and a flow velocity of the mixture of the raw materials. Although the ratio is 80:20 in a circular-net apparatus, the ratio is controlled at 60:40 by opening/closing a slice 507 through a slice control screw jack 504 to control the flow velocity in this embodiment. A cylinder 505 filled with water is rotated to generate a water level difference between the cylinder 505 and the inclined tube 502. Then, the raw materials of a functional heating paper are attached to the surface of the cylinder 505 by the water level difference. Moisture of the raw materials in a wet paper state is absorbed by a vacuum fan 509 disposed above the cylinder 505. The mixture of raw materials is fed to perform a pressing process. The raw materials remaining in the pressing process flow out through an overflow 508 to return to a raw material loading port 501. The secondary ground in an initial state is formed through the process.

Referring to FIG. 16, the secondary ground fed to the VAT apparatus has a heating element which has various shapes such as a triangle, a diamond, a trapezoid, a hexagon, a parallelogram and a clover and is formed in a specified pattern. The secondary ground is formed to have a specified width (300~2400 mm) and a specified strength.

In order to form a pattern such as a triangle, a diamond and a hexagon in regular arrangement, lead, aluminum or alloy is welded to a surface metal wire 602 of the VAT cylinder. In another way, a VAT wire 601 is manufactured to have a pattern formed of a chemical material or resin capable of being adhered to metal, for example, silica gel, polyurethane, polyacrylonitrile, polyethylene and rubber compounds, and a pattern and an insulating cutting guide line 603 to be punched are formed. Then, while the secondary ground is in close contact with the surface of the VAT wire 601, a filling material such as epoxy resin capable of being adhered to metal is filled in mesh holes in the same pattern as the pattern punched in a wire-mesh surface, thereby completing the VAT sealing and the cutting guide line.

Further, conductive polymer (1~10%) and a functional inorganic mixture 601 (tourmaline, holrait stone and anion generating mineral) (1~10%) are added to the secondary ground at a specified content to combine with the paper pulp (40~90%) and synthetic fibers such as polyester fibers (5~30%).

Meanwhile, a carbon powder mixed solution is coated on the upper surface of the secondary ground. The carbon powder mixed solution is prepared by mixing carbon nanotubes (single-wall type), i.e., 3~50% carbon powder with respect to the weight of the ground, 2~30% conductive polymer containing at least one of polyaniline, polypyrrole and polythiophene with respect to the weight of the ground, 1~5% water-soluble binder containing at least one of water-soluble epoxy resin, water-soluble acrylic resin and water-soluble urethane resin with respect to the weight of the ground, and water. The carbon powder mixed solution is coated to form a carbon powder mixed layer (heating element layer). In this case, the carbon powder mixed solution is not coated on inner and outer portions of the pattern which do not require electricity conduction, thereby ensuring the cutting guide line.

Further, a silver electrode wire is formed on the upper surface of the secondary ground having the carbon powder mixed layer serving as a heating element. Referring to FIGS. 13 and 17, first, a silver powder mixed solution is prepared by mixing silver powder with a binder such as silicon, urethane or urepoxy (mixture of urethane and epoxy resin) capable of allowing flexibility and a diluting agent. Then, the secondary ground and the silver powder mixed solution are fed to a mixing tank including horizontal or vertical rotation wings and a scratching device (doctor knife). A single or a plurality of electrodes are engraved at specified spacing in a funnel shape on a rubber or stainless steel roller to form specified electrodes having an electrode width of 1~25 mm. The silver powder mixed solution is applied to the roller. Then, the silver powder mixed solution is printed on the secondary ground by the roller and then dried, thereby forming a silver electrode wire 305 on the heating element of the secondary ground. Further, a copper foil wire 304 having (35~50 μm) treated with a conductive cohesive or adhesive mainly containing a conductive polymer (aniline-based, pyrrole-based or thiophene-based polymer) is cut by a laser to have a width of 10~25 mm. Then, the copper foil wire 304 is disposed on the silver electrode wire 305 to overlap each other or spaced at a specified distance, about 2~10 mm, from the end of the silver electrode wire 305. The copper foil electrode wire 304 is pressed and installed on the silver electrode wire 305 by a cooling roller 703 and a plate out roller 705. Further, a raw resin material of an insulating material (HDPE, LDPE, LLDPE, VLDPE, PP, PEN, PET, noncombustible PET, PVC, noncombustible PVC, PU, TPU, PI, silicone, or heat resistant silicone), that is, adhesive resin identical to a finishing insulating film, is melted and ejected in a T-die to be pressed with an insulating film supplied from an insulating film supply device 707 through a casting roller 706, thereby forming an insulating layer.

Accordingly, through an insulating process for forming an insulating film 306 on the planar heating element including the silver electrode wire 305 and the copper foil wire 304 by pressing or coating, injecting, it is possible to highly improve a temperature application range, thereby enabling the heating element having a thickness of 0.15~2.8 mm to be heated to a temperature of 380° C. Thus, it is possible to manufacture the improved planar heating element having a complex multi-layer structure for various uses.

Thus, high resistant carbon micro-fibers and carbon powder coated according to the present invention can completely replace a conventional heating element using resistance heat of a nichrome wire. Further, it is possible to form a single heating element having a large width and an ultra thin heating element without temperature restriction by overcoming drawbacks of a carbon powder printed heating element serving as an initial module of the planar heating element. It is possible to form a heating element or a heating module using DC and AC electricity without restriction by solving problems in installation and use, for example, space restriction, thereby various convenient heating elements.

Further, according to the present invention, it is possible to form a functional planar heating element by increasing a temperature application range to satisfy user demand and minimize restriction on the width of the planar heating element. Further, the planar heating element can be widely applied when DC and AC electricity are used and provide advantages in health by using electricity of clean energy, minimizing the bad effect of an electromagnetic wave, and emitting far infrared rays. Moreover, it is possible to maximize an energy reduction effect and a heating effect compared to a conventional heating element.

Further, according to the present invention, the planar heating element has a structure without the bad effect of an electromagnetic wave generated in a conventional planar heating element, thereby having advantages in health. Further, it is possible to highly reduce an electricity consumption amount compared to other planar heating elements, thereby increasing economical efficiency and minimizing environmental pollution. Moreover, it is possible to maximize electrical safety by adding or coating an anti-static material onto the insulating film or the melted adhesive resin to prevent electrical charge for ground voltage.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The present invention provides a planar heating element capable of being applied to a home heater, an office heater, and a car heater, highly reducing an electricity consumption amount, increasing economical efficiency and minimizing environmental pollution. Thus, the present invention has industrial applicability.

What is claimed is:

1. A method of manufacturing a planar heating element comprising, the steps:

forming a ground using a carbon micro-fiber mixed solution formed by mixing carbon micro-fibers having a length of 5-25 mm and a thickness of 20-100 μm with paper pulp, a water-soluble binder and water, preparing a carbon powder mixed solution by mixing 3-50% carbon powder with respect to the weight of the ground, 2-30% conductive polymer with respect to the weight of the ground, 1-5% water-soluble binder with respect to the weight of the ground and water, forming a conductive polymer layer by coating a conductive polymer on the ground including the carbon micro-fibers, manufacturing a planar heating sheet by impregnating and coating the carbon powder mixed solution on one surface or both surfaces of the ground including the conductive polymer layer and drying to form a carbon powder mixed layer, cutting the planar heating sheet including the carbon powder mixed layer to have a specified width and length, forming a silver electrode wire by coating a silver powder mixed solution, which is the silver powder mixed with the water-soluble binder and a diluting agent, so that the silver electrode wires are formed on opposite sides of an upper surface of the cut planar heating sheet, each silver electrode wire having a width of 10-25 mm and drying, forming a copper foil electrode wire by pressing the copper foil electrode wire having a thickness of 35-50 μm, a width of 10-25 mm and a length equal to the silver electrode wire, wherein a bottom surface of the copper foil electrode wire is coated with a conductive adhesive mainly containing a conductive polymer, on the silver electrode wire, and forming an insulating layer by coating a melted insulating material on the planar heating sheet including the silver electrode wire and the copper foil electrode wire and drying to form the planar heating element.

2. The method according to claim 1, wherein the carbon micro-fiber mixed solution further comprises polyester-based synthetic fibers, and the step of forming a ground comprises deposing the carbon micro-fiber solution on a blanket from a culture tank maintained at a heating temperature of 60-150° C.

3. The method according to claim 2, wherein the carbon powder mixed solution further includes a functional inorganic material containing at least one of tourmaline and holrait stone at 1-5% with respect to the weight of the ground.

4. The method according to claim 2, wherein the carbon micro-fiber mixed solution is formed of 8-30% carbon micro-fibers with respect to the weight of the ground, 2-30% polyester synthetic fibers with respect to the weight of the ground, and 40-90% pulp with respect to the weight of the ground.

5. The method according to claim 1 wherein the conductive polymer of the carbon micro-fiber mixed solution further comprises at least one of polyaniline, polypyrrole and polythiophene.

6. The method according to claim 5, wherein said water-soluble binders further comprise at least one of water-soluble epoxy resin, water-soluble acrylic resin and water-soluble urethane resin.

7. The method according to claim 1, wherein in the step of forming an insulating layer, and an additional layer of the insulating solution is applied to the planer heating sheet to provide an insulating layer having at least two layers of insulating material.

8. The method according to claim 7, wherein the insulating material is formed by mixing at least one selected from a group consisting of HDPE, LDPE, LLDPE, VLDPE, PP, PEN, PET, noncombustible PET, PVC, noncombustible PVC, PU, TPU, PI, silicone, and heat resistant silicone.

9. A method of manufacturing a planar heating element, comprising the steps of:

forming a primary ground by mixing paper pulp, synthetic fibers, which are polyesters and water, wherein 40-90% paper pulp with respect to the weight of the primary ground is mixed with 5-30% polyester fibers with respect to the weight of the primary ground, forming a secondary ground by mixing paper pulp, synthetic fibers, which are polyesters, carbon micro-fibers and water, wherein a carbon micro-fiber mixed solution prepared by mixing 40-90% paper pulp with respect to the weight of the secondary ground, 2-30% polyester fibers with respect to the weight of the secondary ground and the carbon micro-fibers having a thickness of 15 nm-50 μm is mixed at 8-50% with respect to the weight of the secondary ground, forming a combination ground by combining the primary ground and the secondary ground, preparing a carbon powder mixed solution by mixing 3-50% carbon powder with respect to the weight of the combination ground, 2-30% conductive polymer with respect to the weight of the combination ground, 1-5% water-soluble binder with respect, to the weight of the combination ground and water, manufacturing a planar heating sheet by impregnating and coating the carbon powder mixed solution on a secondary ground-formed surface of the combination ground and drying to form a carbon powder mixed layer, cutting the planar heating sheet including the carbon powder mixed layer to have a specified width and length, forming a silver electrode wire by coating a silver powder mixed solution prepared by mixing silver powder with a water-soluble binder and a diluting agent on a carbon powder mixed layer-formed surface of the cut planar heating element to have a width of 10-25 mm from both ends of the planar heating sheet and drying, forming a copper foil electrode wire by pressing and forming the copper foil electrode wire having a thickness of 35-50 μm, a width of 10-25 mm and a length equal to the silver electrode wire, wherein a bottom surface of the copper foil electrode wire is coated with a conductive adhesive mainly containing a conductive polymer, on the silver electrode wire, and forming an insulating layer by coating a melted insulating material on the planar heating sheet including the silver electrode wire and the copper foil electrode wire and drying to form the planar heating element.

10. The method according to claim 9, wherein the carbon micro-fiber mixed solution further includes 0.1-40% carbon nanotubes with respect to the weight of the secondary ground.

11. The method according to claim 9, wherein the secondary ground is formed in a net structure having a pattern of specified spacing and regular arrangement through a VAT wire.

12. The method according to claim 9, wherein the primary ground is formed by depositing the mixed paper pulp and synthetic fibers on a blanket.

13. The method according to claim 11, wherein the pattern of the secondary ground has a repeating pattern of triangles, diamonds and hexagons and a cutting guide line is formed at a specified distance from the pattern.

14. The method according to claim 10, wherein the carbon micro-fiber mixed solution further includes a functional inorganic material containing at least one of tourmaline and holrait stone at 1-5% with respect to the weight of the secondary ground.

15. The method according to claim 9, wherein the carbon powder mixed solution further includes a functional inorganic material containing at least one of tourmaline and holrait stone at 1-5% with respect to the weight of the ground.

16. The method according to claim 9, wherein the water-soluble binders contains at least one of water-soluble epoxy resin, water-soluble acrylic resin and water-soluble urethane resin.

17. The method according to claim 9, wherein the conductive polymer of the carbon powder mixed solution contains at least one of polyaniline, polypyrrole and polythiophene.

18. The method according to claim 9, wherein in the step of forming an insulating layer, and an additional layer of the insulating solution is applied to the planar heating sheet to provide an insulating layer having at least two layers of insulating material.

19. The method according to claim 9, wherein the insulating material is formed by mixing at least one selected from a group consisting of HDPE, LDPE, LLDPE, VLDPE, PP, PEN, PET, noncombustible PET, PVC, noncombustible PVC, PU, TPU, PI, silicone, and heat resistant silicone.

* * * * *